(12) United States Patent
Young et al.

(10) Patent No.: US 10,318,734 B2
(45) Date of Patent: Jun. 11, 2019

(54) NETWORK MANAGED ANTIVIRUS APPLIANCE

(71) Applicant: Leidos, Inc., Reston, VA (US)

(72) Inventors: Alan G. Young, Herndon, VA (US);
Paul L. Bartruff, Leesburg, VA (US);
Eric E. Brown, Ashburn, VA (US);
Michael P. Miley, Vienna, VA (US)

(73) Assignee: Leidos, Inc., Reston, VA (US)

( * ) Notice: Subject to any disclaimer, the term of this patent is extended or adjusted under 35 U.S.C. 154(b) by 0 days.

(21) Appl. No.: 14/528,360

(22) Filed: Oct. 30, 2014

(65) Prior Publication Data

US 2015/0052365 A1 Feb. 19, 2015

Related U.S. Application Data

(63) Continuation of application No. 13/020,900, filed on Feb. 4, 2011, now Pat. No. 8,910,288.

(60) Provisional application No. 61/390,874, filed on Oct. 7, 2010, provisional application No. 61/301,697, filed on Feb. 5, 2010.

(51) Int. Cl.
*G06F 21/56* (2013.01)
*H04L 29/06* (2006.01)
*G06F 21/55* (2013.01)

(52) U.S. Cl.
CPC .......... *G06F 21/567* (2013.01); *G06F 21/552* (2013.01); *G06F 21/56* (2013.01); *G06F 21/564* (2013.01); *H04L 63/0861* (2013.01); *H04L 63/145* (2013.01); *H04L 63/1416* (2013.01); *G06F 2221/2141* (2013.01)

(58) Field of Classification Search
CPC ...... G06F 21/56; G06F 21/564; G06F 21/567; G06F 2221/2141; H04L 63/0861; H04L 63/1416; H04L 63/145
See application file for complete search history.

(56) References Cited

U.S. PATENT DOCUMENTS 823,011 A 6/1906 Weber
6,772,345 B1 8/2004 Shetty
(Continued)

OTHER PUBLICATIONS

Security Requirements for Cryptographic Modules, FIPS Publication 140-2, NIST Federal Information Processing Standard (May 25, 2001).*

*Primary Examiner* — Theodore C Parsons
(74) *Attorney, Agent, or Firm* — Banner & Witcoff, Ltd.

(57) ABSTRACT

Data can be scanned using a network managed appliance. The network managed appliance may integrate commercial hardware elements connected through a basic or simplified operating system environment expressly developed for the appliance, thus being more malware resistant and less vulnerable to attacks from the scanned data or other sources. The network managed appliance may be a self-contained apparatus with an integrated chassis, designed and configured as "single-purpose" device. Such appliances may be connected to an appliance management network including central management servers in communication with appliances in remote locations. The central management servers may ensure that scanning software and the definitions lists for each of the appliances are current and match an enterprise-approved configuration. In addition, an antivirus appliance may facilitate creation and management of user rights assignments for those files.

21 Claims, 10 Drawing Sheets

(56) References Cited

U.S. PATENT DOCUMENTS

| | | |
|---|---|---|
| 7,239,166 B2 | 7/2007 | Braverman et al. |
| 7,689,824 B2 | 3/2010 | Imaizumi et al. |
| 7,913,119 B2 | 3/2011 | Hama |
| 8,214,895 B2 | 7/2012 | Kuo et al. |
| 8,560,864 B2 | 10/2013 | Chang et al. |
| 2003/0145228 A1 | 7/2003 | Suuronen et al. |
| 2003/0204732 A1* | 10/2003 | Audebert ............ H04L 63/0846 713/182 |
| 2004/0181679 A1* | 9/2004 | Dettinger ............ G06F 21/6245 713/193 |
| 2005/0044400 A1 | 2/2005 | Li et al. |
| 2005/0120231 A1 | 6/2005 | Harada et al. |
| 2007/0280509 A1* | 12/2007 | Owen ..................... G06F 21/32 382/115 |
| 2008/0104694 A1* | 5/2008 | Powell .................... G06F 21/78 726/16 |
| 2009/0055896 A1 | 2/2009 | Aoki et al. |
| 2009/0204964 A1 | 8/2009 | Foley et al. |
| 2009/0217379 A1 | 8/2009 | Chang et al. |
| 2010/0037324 A1* | 2/2010 | Grant ................... G06F 21/554 726/27 |
| 2010/0046553 A1* | 2/2010 | Daigle ................... G06F 21/35 370/474 |
| 2010/0100724 A1* | 4/2010 | Kaliski, Jr. ........... H04L 9/3013 713/155 |
| 2010/0132042 A1 | 5/2010 | Zhang |
| 2010/0212012 A1* | 8/2010 | Touboul ................ G06F 21/554 726/23 |
| 2010/0242082 A1* | 9/2010 | Keene ................ G06F 21/6218 726/1 |
| 2010/0268936 A1* | 10/2010 | Matsushima ........... G06F 21/62 713/153 |
| 2011/0087899 A1 | 4/2011 | Fetik |
| 2011/0131607 A1 | 6/2011 | Thomas et al. |
| 2012/0005475 A1* | 1/2012 | Inagaki ................. H04N 7/147 713/150 |
| 2012/0023494 A1* | 1/2012 | Harrison ................ G06F 21/53 718/1 |
| 2013/0283383 A1* | 10/2013 | Khosravi ................ G06F 21/51 726/24 |

* cited by examiner

NETWORK MANAGED ANTIVIRUS APPLIANCE

RELATED APPLICATIONS

The present application is a continuation of U.S. patent application Ser. No. 13/020,900, filed Feb. 4, 2011, entitled "Network Managed Antivirus Appliance," which is a non-provisional of U.S. Provisional Application Ser. No. 61/301,697, filed Feb. 5, 2010, and is also a non-provisional of U.S. Provisional Application Ser. No. 61/390,874, filed Oct. 7, 2010, both of which are entitled "Network Managed Antivirus Appliance." The contents of these related applications are incorporated herein by reference in their entirety for all purposes.

BACKGROUND

Some amount of security risk is inherent when transferring digital data between different computers and/or computer networks. Computer networks that interact with other networks are constantly exposed to malware, or malicious software, such as viruses, worms, and Trojan horses, which are built to infiltrate every level of the computer software architecture. Although many different virus scanning software products are currently available in the market, these products often fail to protect computer networks from the most harmful viruses. Virus detection software is reactive by nature. In many cases, virus scanners cannot detect a virus until it has been created, deployed on a computer network, identified as a virus after causing some harm to the computer network, and identifying characteristics of the virus (i.e., a virus definition) are cataloged and incorporated into the latest version of a virus detection software program. Therefore, new computer viruses and malware may simply be undetectable by any antivirus software. Additionally, even known viruses may elude detection, for example, by "hiding" in an unscanned partition or other location to avoid detection. Further, certain viruses or malware may attack the recipient at the level of the device driver, or operating system, or may attack the antivirus software itself, thereby allowing the virus to infect the computer and propagate itself before the virus scanning process is invoked.

One technique for reducing the risk of virus propagation between computer networks involves separating the computer networks with an "air gap," this is, physically separating the computer networks so that no direct digital communication link exists. When an air gap separates two computer networks, any data transfer between the computer networks requires a manual step in which a user transfers files from the first computer network onto a portable storage media (e.g., a USB thumb drive, a read/writable CD or DVD, etc.). The portable storage media is then physical disconnected/removed from the first computer network, and physically connected to the second computer network to upload the transferred files. Thus, no direct communication link exists at any time between the computer networks, and all of the transferred data will reside on the portable media for a period of time during the transfer. During this period of time, the data residing on the portable media may be virus scanned to assure that the transferred files are not corrupt and will not transmit a virus between the networks. An existing technique involves virus scanning the data during the transfer using a standalone commercial personal computer (PC) having commercial virus scanning software installed, wherein the standalone computer is not connected to either of the computer networks, thus assuring that any virus within the data can only corrupt the standalone computer and will not spread to any larger network.

However, there are several drawbacks to existing systems that use standalone commercial PCs to transfer data between computer networks. First, because these standalone PCs are intentionally un-networked, they must be manually operated by a human data transfer officer (DTO). Thus, any update to antivirus software or virus definition files must be performed manually. Similarly, any outputs (e.g., detection of a virus, status reporting, statistical analysis, etc.) cannot be transmitted outside of the standalone computer. Thus, the results of the virus scans, and any other output from the standalone PC must be manually reviewed and/or printed out before they can be communicated to a centralized system for analysis. In large scale computer networks having many different standalone virus scanning PCs at different remote locations, this limitation makes the rapid review and analysis of virus detection across the network extremely cumbersome.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

At least some embodiments of the present disclosure include systems and methods for malware (e.g., virus) scanning media and other data using a network managed antivirus appliance. In one or more configurations, for example, network managed antivirus appliances may integrate commercial hardware elements connected through a barebones operating system environment expressly developed for the network managed antivirus appliance (e.g., starting from Linux CentOS 5). The operating system implementation for the antivirus appliances in some such embodiments may thereby be malware resistant and less vulnerable to attacks from the media being scanned. Additionally, network managed antivirus appliances may be configured without one or more features and/or software applications that may serve as attack vectors for various malware, for example, web browsers, device drivers, and email applications.

In certain embodiments, a network managed antivirus appliance may be housed in an integrated chassis with simple-to-operate external buttons to control operations, and easy-to-read results indicators. Network managed antivirus appliances may be designed and configured as "single-purpose" devices, offering simple to use controls, automatic media recognition, and easy to read results. The antivirus appliances may also have a small physical footprint, so that the appliances take up minimal desktop space and consume less power, and so that multiple units can be stacked if desired. Since the antivirus appliance may be self-contained, it may be less vulnerable to physical attacks or compromises.

In at least some embodiments, the antivirus appliance may be connected to an antivirus appliance management network. The antivirus appliance management network may include one or more central management servers in communication with many different antivirus appliances in remote locations. Since the antivirus appliances may be network connected, the management network can help ensure that antivirus scanning software and the definitions lists for each of the antivirus appliances are current and match an enterprise-approved configuration. Additionally, the networked antivirus appliances will be able to report scanning activity and virus detection to a central control point. Each of the antivirus appliances may use a client-approved one-way communications controller, to avoid the risk of virus propagation within the management network.

BRIEF DESCRIPTION OF THE DRAWINGS

Certain embodiments are illustrated by way of example and not limited in the accompanying figures in which like reference numerals indicate similar elements and in which.

DETAILED DESCRIPTION

In the following description of various exemplary embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Figure 1:
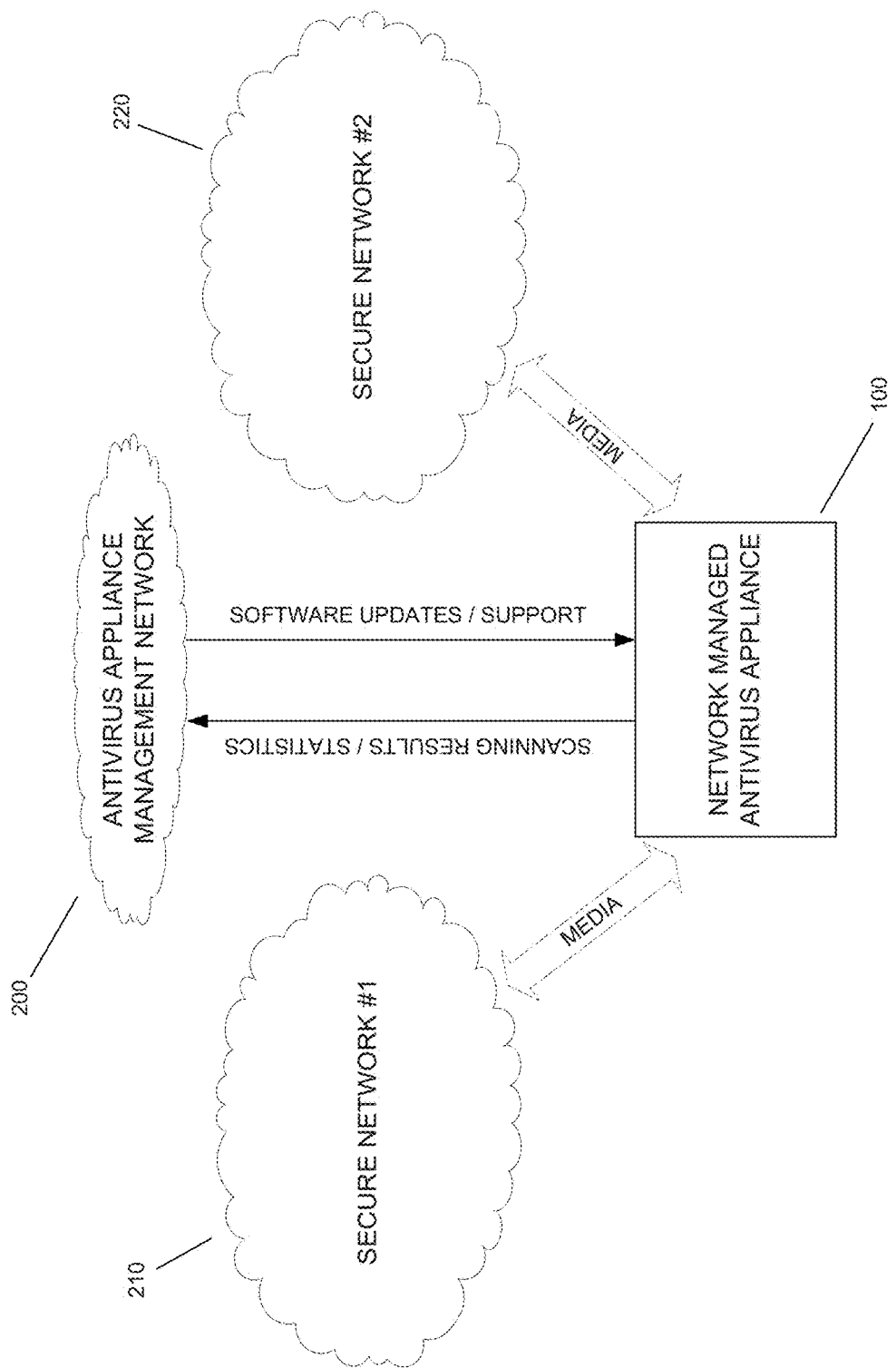
FIG. 1 is a component diagram including an antivirus appliance management network, a network managed antivirus appliance, and two secure computer networks in accordance with one or more embodiments.

Referring to FIG. 1, an illustrative component diagram is shown including a network managed antivirus appliance 100, which may be part of an antivirus appliance management network 200, and two separate secure computer networks 210 and 220. The network managed antivirus appliance 100 may be a computing device including one or more processors and memory storing software. Computer executable instructions and data used by the processor(s) and other components of the antivirus appliance 100 may be stored in a storage facility such as a memory. The memory may comprise any type or combination of read only memory (ROM) modules or random access memory (RAM) modules, including both volatile and nonvolatile memory such as disks. The software of the antivirus appliance 100 may be stored within the memory to provide instructions to the processor(s) such that when the instructions are executed, the processor(s), the antivirus appliance 100 and/or other components of the antivirus appliance 100 are caused to perform various functions or methods such as those described herein. Software may include both applications and operating system software, and may include code segments, instructions, applets, pre-compiled code, compiled code, computer programs, program modules, engines, program logic, and combinations thereof. Computer executable instructions and data may further be stored on computer readable media including electrically erasable programmable read-only memory (EEPROM), flash memory or other memory technology, CD-ROM, DVD or other optical disk storage, magnetic cassettes, magnetic tape, magnetic storage and the like. Some or all of the instructions implemented by processor or other components so as to carry out the operations described herein may also be stored as hard-wired instructions (e.g., logic gates). For example, the processor could include one or more application specific integrated circuits (ASICs) configured to carry out operations such as those described herein.

Although the above description of FIG. 1 generally describes a network managed antivirus appliance 100 as a single-purpose computing device, other apparatuses or devices or systems may include the same or similar components and perform the same or similar functions and methods. For example, a general purpose computer such as a commercial PC may include the components or a subset of the components described above and may be configured to perform the same or similar functions as a network managed antivirus appliance 100. Other example apparatuses that may be configured to incorporate one or more of the functions of the network managed antivirus appliance 100 include one or more terminal devices, mobile devices, displays, or routers. Such apparatuses may include dedicated processors or programmable general purpose processors (e.g., such as those used in general computing systems). Additional or alternative components may also be included in apparatuses configured according to aspects described herein.

Each of the computer networks illustrated in FIGS. 1, 200, 210, and 220, may include wired and wireless connections and network elements, and connections over the network may include permanent or temporary connections. Communication through any of networks 200-220 may include additional mobile or fixed devices such as GPS (Global Positioning System) devices or satellites, radio broadcasting receivers/transceivers, and any combination thereof. Although shown as single individual networks in FIG. 1 for simplicity, each of networks 200, 210, and 220 may include multiple networks that are interlinked so as to provide internetworked communications. Such networks may include one or more private or public packet-switched networks (e.g., the public Internet, one or more Ethernet networks and/or other private networks utilizing Internet Protocol (IP) and/or other protocols), one or more private or public circuit-switched networks (e.g., a public switched telephone network, a cellular network configured to facilitate communications to and from mobile communication devices), a short or medium range wireless communication connection (e.g., a Bluetooth®, ultra wideband (UWB), infrared, WiBree, wireless local area network (WLAN) according to one or more versions of Institute of Electrical and Electronics Engineers (IEEE) standard no. 802.11), or a high-speed wireless data network (such as Evolution-Data Optimized (EV-DO) networks, Universal Mobile Telecommunications System (UMTS) networks, Long Term Evolution (LTE) networks or Enhanced Data rates for GSM Evolution (EDGE) networks). The computing devices within networks 200, 210, and 220 may use various communication protocols such as Internet Protocol (IP), Transmission Control Protocol (TCP) and/or, Simple Mail Transfer Protocol (SMTP) among others known in the art. Various messaging services such as Short Messaging Service (SMS) and/or Multimedia Message Service (MMS) may also be included. In certain embodiments, a network managed antivirus appliance 100 might only allow outbound network traffic to a reduced number of predefined IP addresses/hosts, and/or over a predefined set of protocols and ports. For example, an antivirus appliance 100 might only support network communication via the following protocols (ports): HTTP (80 TCP), HTTPS (443 TCP), FTP (20, 21 TCP), SSH/SCP/SFTP (22 TCP), SYSLOG (514 UDP), NTP (123 UDP), DNS (53 TCP), SNMP (161/162 UDP), and/or any additional port(s) required by a software component running on the appliance (e.g., the antivirus scanning and malware detection software). In this example, communication through all other ports (e.g., any other Internet Assigned Number Authority (IANA) registered port or other well-known port) may be disabled or not supported by the operating system build. Other embodiments of antivirus appliances 100 need not allow inbound and outbound traffic on each of the above protocols (and ports), but might support only a subset. For example, an antivirus appliance 100 might only allow communication on ports 80, 443, 20, 21, 22, 514, and 123, and might not allow communication on ports 53, 161, and 162. In other examples, different subsets of ports may be supported. Further, certain embodiments may support one subset of protocols (and ports) for outbound network traffic from the antivirus appliance 100 to the management network 200, and may support a different subset of protocols (and ports) for inbound network traffic from the management network 200 to the antivirus appliance 100.

The network managed antivirus appliances 100 within the network 200, and the computers within the secure computer networks 210 and 220, may be configured to interact with the other devices in their respective networks. However, in certain embodiments, the networks 200, 210, and 220 may be isolated from one another and may have no digital communication links (e.g., all three networks may be separated by an 'air gap'). In other embodiments, the network managed antivirus appliance 100 and/or the entire antivirus appliance management network 200 may be connected directly (i.e., without an 'air gap') to one or both of the secure computer networks 210 or 220, so that files may be directly transferred from one secure network 210 through the antivirus appliance 100 to the other secure network 220. The software within the antivirus appliance 100, and the computing devices within networks 200-220 may be stored in computer-readable memory such as read only, random access memory, writeable and rewriteable media and removable media in the devices and may include instructions that cause one or more components—e.g., processor, a transceiver, and/or a display—of the devices to perform various functions and methods including those described herein.

Figure 2:
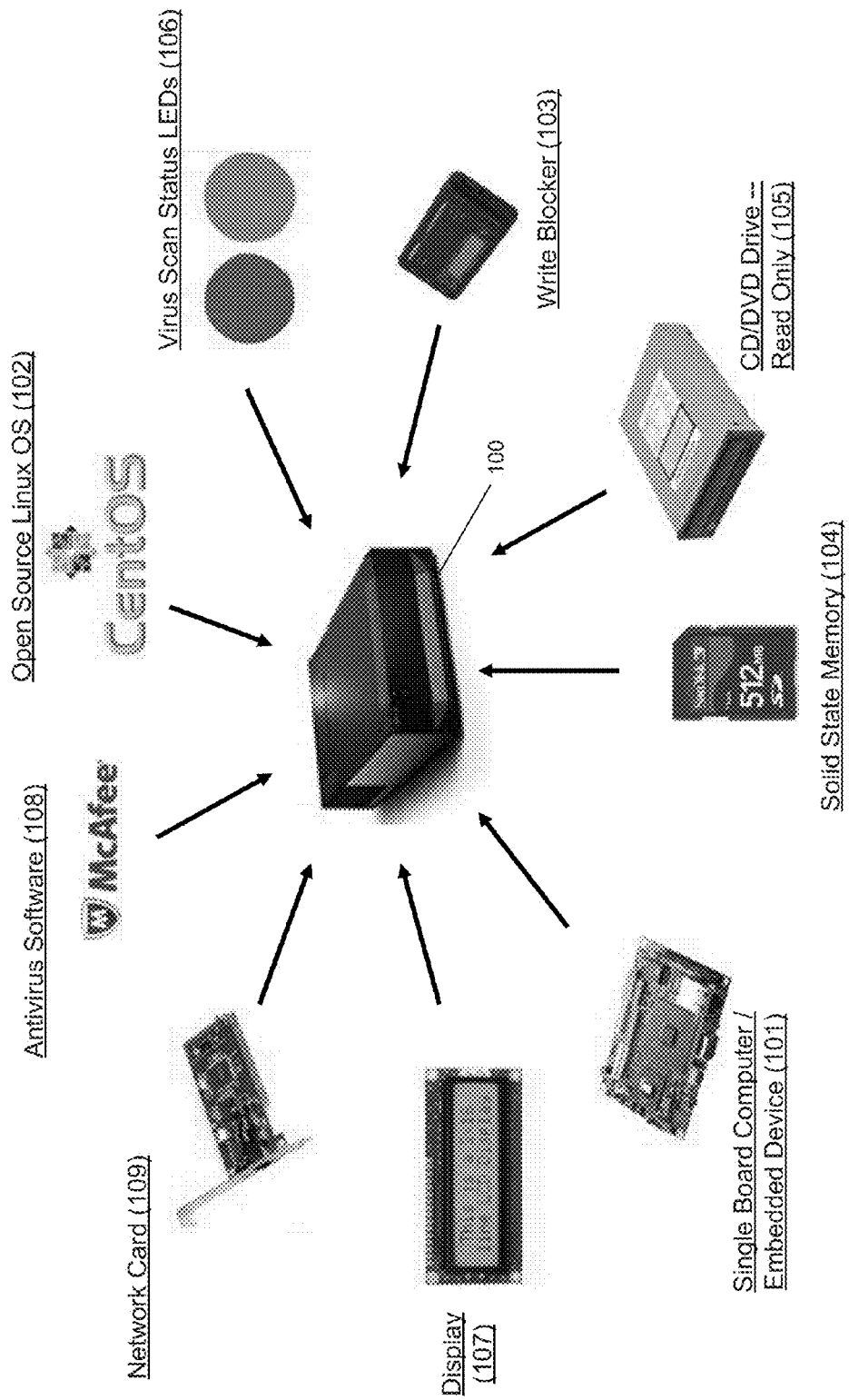
FIG. 2 is a diagram illustrating a network managed antivirus appliance and its various functional components in accordance with one or more embodiments.

Referring to FIG. 2, an illustrative diagram is shown including a network managed antivirus appliance 100 and its various functional component parts. The icons, labels, and objects on the outer edges of FIG. 2 are representative of the components and functionality that may be integrated into the network managed antivirus appliance 100 at the center of the diagram. In certain implementations, the antivirus appliance 100 may be made in whole or in part from commercial off the shelf hardware with a custom case.

The components, features, and/or functionality that may be incorporated into an antivirus appliance 100 include the following:

a. CPU (central processing unit)—In certain embodiments, the antivirus appliance 100 may use an x86 processor 101.

b. OS (operating system)—In certain embodiments, the antivirus appliance 100 may contain a customized Linux kernel 102 stripped of all unnecessary packages that do not support the required features.

c. USB (universal serial bus)—In certain embodiments, the antivirus appliance 100 may incorporate a Tableau T8 write blocker (103).

d. Memory—In certain embodiments, the antivirus appliance 100 may contain at least enough system memory to unpack zip files, tar files, and other compressed formats (104).

e. CD/DVD (compact disk/digital video disk)—The antivirus appliance 100 may incorporate a CD/DVD reader 105. In certain embodiments, the CD/DVD would not include write capability to avoid the possibility of corrupting the data on the CD/DVD with any malware running on the antivirus appliance.

f. Network/Logs—In certain embodiments, the antivirus appliance 100 may create, store, and transmit log files containing, for example, a date/time stamp, a device IP address of the appliance, one or more identifiers of the media scanned, a success or failure scan result, the virus definitions version currently in use on the appliance, and operating system version on the appliance. As discussed below in greater detail, log analysis/reduction software may be present at the appliance 100 or elsewhere with the management network 200, and may be provided via a network card 109 and/or an internet interface.

g. Network/AV—In certain embodiments, upon powering up the antivirus appliance 100 and/or at a pre-determinable time interval, the antivirus appliance 100 may poll a file transfer protocol (FTP) or hypertext transfer protocol (HTTP) server to determine if updates to the operating system and/or updated antivirus definitions are available. In these examples, if an operating system update and/or antivirus software update is available, the antivirus appliance may automatically download and apply the update(s).

h. User Interface—In certain embodiments, the antivirus appliance 100 may contain a display screen, for example LEDs 106 and/or an LCD or touch screen display 107, providing user feedback including success or failure of scans, OS version, AV definition dates/version, and write block status.

i. Network—In certain embodiments, the antivirus appliance 100 may incorporate a hardware or software firewall which will block all unnecessary traffic. Additionally, in certain embodiments, the antivirus appliance 100 may be capable of incorporating different network interfaces including optical fiber depending upon the requirements of the customer.

j. Footprint—In certain embodiments, the antivirus appliance 100 may be designed as a compact single purpose computing device with a relatively small footprint.

k. Input—In certain embodiments, the antivirus appliance 100 may be designed having no inputs for serial, keyboard, mouse, monitor, or any other external input/output (I/O) devices not expressly needed for antivirus scanning.

l. Operating System—In certain embodiments, the operating system of the antivirus appliance 100 may reside on a removable media such as an SD card 104. In certain implementations, one or more configurable parameters may be provided to require that any changes to data stored on the removable media containing the OS be made by removing that media from the device and performing any reprogramming or other write-modification on a PC (e.g., using custom software). Such removable media also may be stored external to the device, for example, in situations where the storage on the device may be designated as classified after scanning.

m. Antivirus Software—In certain embodiments, the antivirus appliance 100 may run x86 based Linux antivirus agents, for example, various types of antivirus software 108, such as are available from McAfee Corp. of Santa Clara, Calif. It should be understood that the terms virus, antivirus, antivirus appliance, antivirus software, and the like, as used throughout this disclosure refer not only to computer viruses, but may refer to all types of malware, or malicious software, such as viruses, worms, and Trojan horses, which may be built to infiltrate any level of the computer software architecture.

Figure 3A:
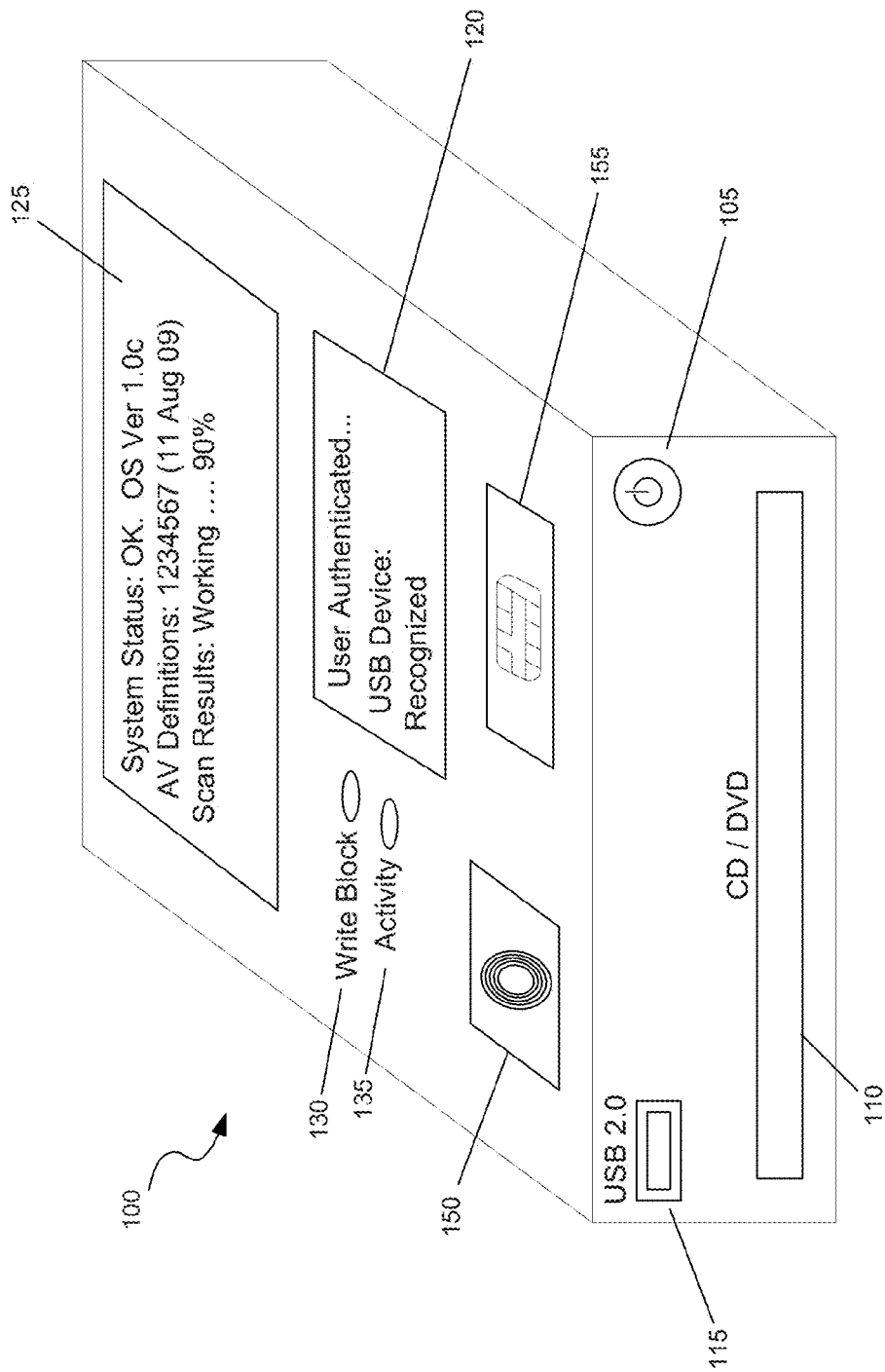
FIGS. 3A-3B are diagrams illustrating a physical embodiment of a network managed antivirus appliance in accordance with one or more embodiments.
Figure 3B:
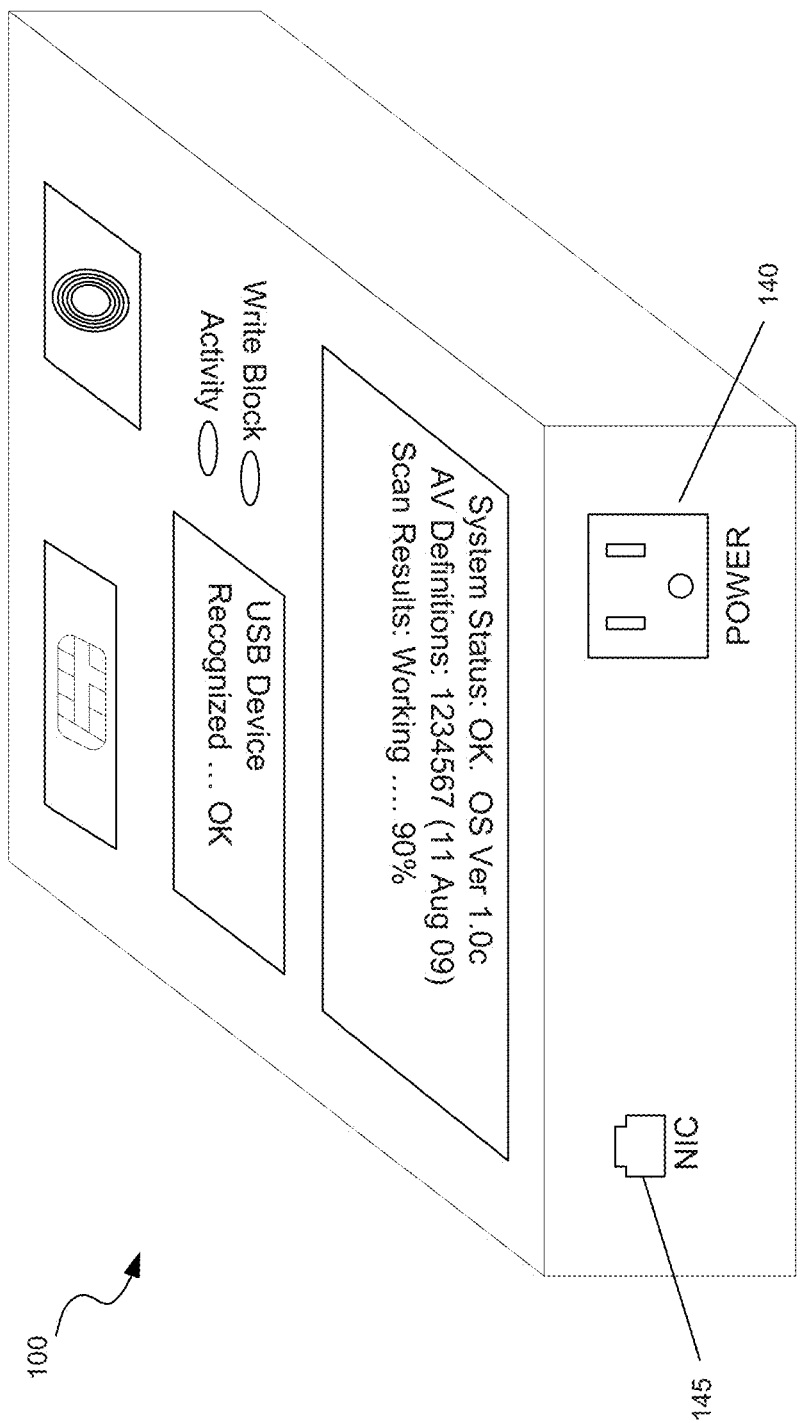

Referring to FIGS. 3A-3B, two physical product diagrams are shown of an illustrative network managed antivirus appliance 100 from two different angles. In this example, the antivirus appliance 100 has a physical footprint only slightly larger than a CD/DVD drive, and is shaped so that multiple appliances 100 may be stacked if desired to save desktop space. In other embodiments, the size of an antivirus appliance 100 may be somewhat larger to accommodate additional physical components, such as for example, the components shown in FIG. 2. For instance, one embodiment of an antivirus appliance 100 may be designed to be approximately 18" high×18" deep×10" thick, and may be stackable on other similarly sized appliances 100. As shown in FIG. 3A, the front panel of the antivirus appliance 100 in this example includes an ON/OFF button 105, an insertion slot for the CD/DVD drive 110, and a USB 2.0 port 115. The top panel of the antivirus appliance 100 includes two separate display screens (e.g., LCD or touch screen displays): a device status display window 120 and a scanning status display window 125. As shown in FIG. 3A, the device status display window 120 may include information indicating that the appliance 100 is turned on and that a user has been successfully authenticated, for example, via a biometric scanner (e.g., fingerprint scanner 150) and/or a hardware token reader (e.g., common access card reader 155). Status window 120 may also include a list the portable media (e.g., USB thumb drive, DVD) that are currently connected to and recognized by the antivirus appliance 100. The scanning status display window 125 may display information about a data/media scan that is currently being performed (or was previously performed) by the antivirus appliance 100. The scanning status data displayed in window 125 may include the OS version, antivirus software definition version, scan status (e.g., "Scanning In Progress", "Scanning Completed", "Ready to Scan", etc.). Once a media scan begins, the amount/size of the data on the portable media may be detected and a scan status may be calculated. As shown in FIG. 3A, the scan status of an in-progress scan may be shown as a number (e.g., 50 MB scanned), a percentage (e.g., 90% completed), and/or as a graphical progress bar rendered in the display window 125. In this example, the top panel of the antivirus appliance 100 also includes two LED status lights 130 and 135. The write block status light 130 may be lit when the write blocker of the appliance 100 is engaged, to inform the user that no data will be allowed to be written onto the inserted media during the scan. In certain embodiments, the write blocker may provide advantages in assuring the user that any media scanned by the antivirus appliance 100 will not be infected by malware during the scan. In other embodiments, the write blocker of the appliance 100 may be an optional component, or may be turned off in response to a user command, to allow the appliance 100 to eliminate viruses and malware during or after the scanning process. The second LED in this example, the activity light 135, may be illuminated during certain functions executed by the antivirus appliance 100. For example, the appliance 100 may turn on the activity light 135 during all media detection, mounting, and antivirus scanning. Additionally, the activity light 135 may be illuminated during transmission of scanning data to the management network 200, and/or receipt of updated antivirus software and/or definitions from the management network 200.

Referring now to FIG. 3B, the same illustrative network managed antivirus appliance 100 is shown from the opposite angle. In this example, the back panel of the antivirus appliance 100 includes a power outlet 140, and network cable outlet 145 to allow the appliance 100 to be connected to the management network 200. Rather than a conventional AC power outlet 140 as shown in FIG. 3B, the power outlet 140 may be of any commonly used size, shape, or configuration for power sources that are well-known in modern computing devices and mobile devices. Additionally, the antivirus appliance 100 may include a battery power source instead of, or in addition to, the power outlet 140. Similarly, network cable outlets 145 of other well-known sizes and shapes may be used. Additionally, the antivirus appliance 100 may include a wireless communication interface (e.g., wireless card, Bluetooth, etc.) instead of, or additional to, the network interface 145, to support connection to the management network 200.

Figure 4:
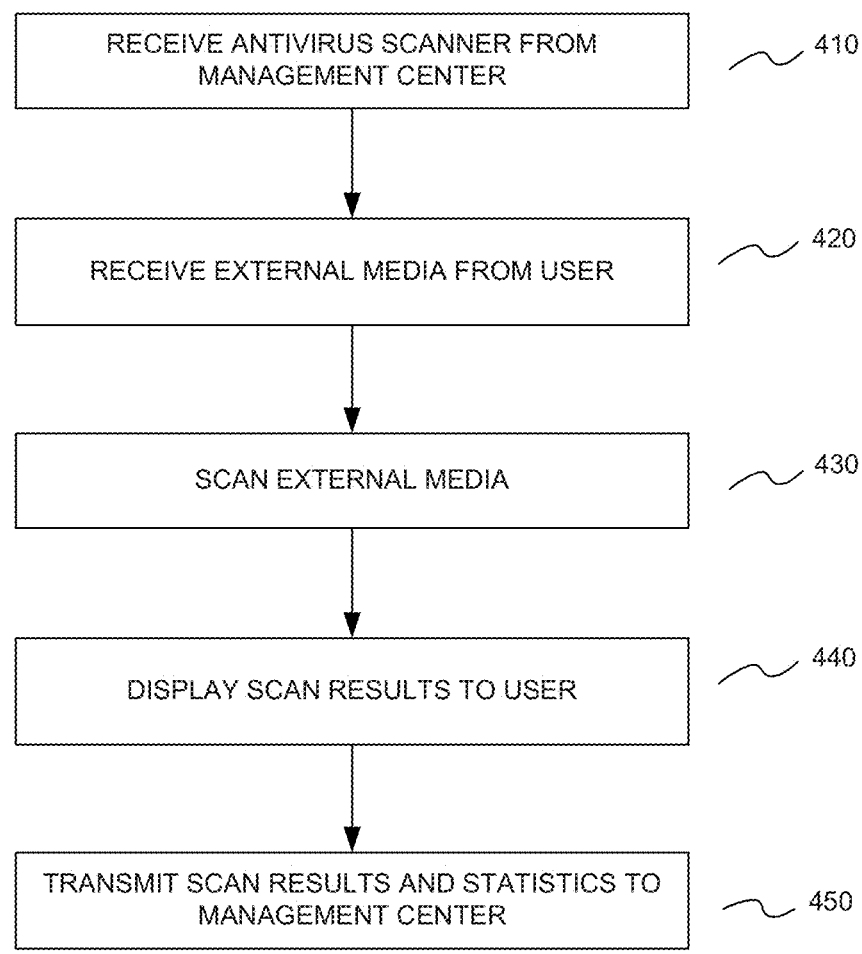
FIG. 4 is a flow diagram illustrating a method of scanning media by a network managed antivirus appliance in accordance with one or more embodiments.

Referring to FIG. 4, a flow diagram is shown illustrating a method including receiving virus scanning software at a network managed antivirus appliance 100, scanning data/media on the appliance 100, and transmitting the results to a server within a management network 200. In step 410, the antivirus appliance 100 receives antivirus scanning software from the management network 200. For example, the antivirus appliance 100 may receive and install a piece of virus scanning software (e.g., antivirus software available from McAfee Corp. of Santa Clara, Calif., or another off-the-shelf antivirus agent) from a central server in the management network 200. In other examples, the antivirus software might not be installed via the network 200, but may be initially installed locally in a manual installation by a user or operator. In this example, after the antivirus software program is initially installed manually, the management network 200 may automatically provide antivirus software updates and/or definition file updates to the antivirus appliance 100 via the network 200 and the network interface 145. Additionally, the virus scanning software may be virtualized, or run using virtualization software, on the antivirus appliance 100. Using virtualization software to run the scanning software may provide an additional layer of abstraction between the scanning engine and the operating system on the appliance 100, thus providing further protection against malware that could potentially infect the operating system.

In step 420, a user inserts one or more portable media into (or otherwise connects the portable media to) the network managed antivirus appliance 100. In the example of FIGS. 3A-3B, a portable media is connected using USB interface 115 or CD/DVD 110. In other embodiments, device 100 may also and/or alternatively include other types of interfaces (e.g., floppy disk drives, additional CD/DVD drives, CF drives, or any other USB connectable storage devices). The antivirus appliance 100 also may support the attachment/insertion and scanning of multiple different storage media simultaneously. As described above, in certain embodiments the antivirus appliance 100 may be directly connected without an 'air gap' to one or more secure computer networks 210 or 220. In these examples, the appliance 100 may receive the files to be scanned from one of the secure networks via an electronic file transfer in step 420, without needing to use to a portable media to receive the files.

In step 430, the network managed antivirus appliance 100 scans the portable media for viruses or other types of malware. During the scanning step, the antivirus appliance 100 may also collect data and statistics regarding the media scanned (e.g., the total size of the media, the number and types of files on the media, the number and types of partitions on the media, etc.), and/or regarding the virus scanning process itself (e.g., the number of media files scanned, identifiers corresponding to any viruses or malware detected in the media, etc.).

In certain embodiments, steps 420 and/or 430 may include one or more types of user authentication performed by the antivirus appliance 100. For example, before a user is permitted to insert and/or scan a portable media using the antivirus appliance 100, the user may be required to authenticate by entering a user login and password via a keyboard or a touch screen integrated into the appliance 100. In other examples, other authentication techniques may be used, such as integrated circuit cards (e.g., smart cards), hardware tokens (e.g., fobs, common access cards, USB tokens), and/or biometrics (e.g., fingerprint or palm print scanning, facial recognition, DNA verification, iris or retina scanning). Accordingly, one or more such scanners may be attached peripherally, or may be directly integrated into the antivirus appliance 100 to provide enhanced user authentication. For instance, a secure customized version of an antivirus appliance 100 may include an integrated fingerprint reader and a common access card (CAC) reader configured for compatibility with CACs issued by a specific entity that will operate that antivirus appliance 100 (e.g., corporation, governmental department, etc.).

In step 440, once the scan has been completed the scan results may be displayed to the user, for example, in the scanning status display window 125. It should be noted that step 440 need not occur after step 430. Rather, the status of the antivirus appliance 100, the portable media, and the malware scanning process may be gathered and displayed anytime before, during, and after the scanning of step 430. The scan results may include a simple pass/fail indicator on the antivirus appliance 100 for ease of use, for example, a red and green light, or a "Pass" or "Fail" text display). In other examples, the malware (e.g., virus) scan results displayed to the use may include more detailed data, such as the number of files (or amount of data) scanned, the types of files or data scanned, the time taken to complete the scan, and/or the number and definitions of any viruses or other malware identified. Additionally, as described above, the scan status of an in-progress scan (e.g., progress bar or percentage completed) may also be displayed.

In step 450, the files scanned and/or scan results and statistics may be transmitted to one or more servers in the management network 200. During the scanning process 430, the antivirus appliance 100 may create a catalog of all files scanned along with certain file properties (e.g., file name, file type, size, author, date modified, etc.) and may forward the cataloged list to the management center server 205 in step 450. In certain embodiments, the data transmitted to the management center server 205 may include additional information not displayed to the user (or operator) of the antivirus appliance 100. For example, the antivirus appliance user may have little or no need for certain data to be displayed, such as the IP address of the appliance 100, the physical location of the appliance 100, the user identifier (e.g., name or login ID) of the user that scanned the media, and the date/time of the scan. However, this information may be useful to during statistical analyses of the virus scanning activities of the management network 200, therefore, some or all of this data may be transmitted to the management center server(s) 205 in step 450. In some embodiments, one or more antivirus appliances 100 may be configured for simplified operation, and may only display a simple pass/fail indicator to the operator following a virus scan of a portable media. However, the antivirus appliances 100 may transmit much more data to the management center server 205 for the purposes of enhanced statistical analyses. For example, the antivirus appliance 100 may transmit the number and types of files scanned, the different partitions of a media scanned, the duration of time taken to complete the scan, the OS version running on the appliance 100, malware (e.g., virus) scanning software and version running on the appliance 100, and the virus scanning or other malware definitions stored on the appliance 100. Additional data transmitted to the management center server 205 may include the details regarding any viruses or malware identified and in which media files the malware or viruses were identified. As discussed below in reference to FIGS. 8 and 9, one or more server(s) 205 in the management network 200 may receive, compile, and analyze data from many different antivirus appliances 100 to identify attacks and potential vulnerabilities across wide-scale networks.

The media scan results, statistics, and any other data transmitted between the antivirus appliance 100 and the management center server 205 may be transmitted using one or more of the standard network communication techniques described above. Additionally, transmissions to or from the antivirus appliance 100 may use secure protocols and/or encryption, such as the Suite B cryptographic algorithms made public by the National Security Agency (NSA). For instance, the antivirus appliance 100 may include an integrated NIC card hardened in accordance with the 140 series of the Federal Information Processing Standards security standards for cryptographic network communication (FIPS 140). By having an antivirus appliance 100 hardened to a FIPS 140 certification or other cryptographic standard, the antivirus appliance 100 may be used in a non-secure environment. Additional secure network communication techniques may also be used to transmit data to and from the management center server 205, for example, multi-factor (or "strong") authentication techniques between senders and receivers, use of a public key infrastructure, and/or personal identity verification (PIV) requirements such as those set forth in Federal Information Processing Standards Publication 201 (FIPS 201). Further, antivirus appliances 100 used in non-secure environments may be equipped with antitampering security features. For example, a device hardened to a FIPS 140 certification may include physical tamper-resistant features and related tamper monitoring features that perform actions if anyone tries to crack into the device (e.g., zeroing out the functionality of the appliance 100, zeroing out the encryption keys and other data, and/or notifying the management server 205 that the device has been compromised). Additional features that may be used for deployment in non-secure environments include adding TEMPEST protections to the antivirus appliance 100, and allowing non-volatile memory to be removed via a compact flash interface for secure storage external to the antivirus appliance 100.

Figure 5:
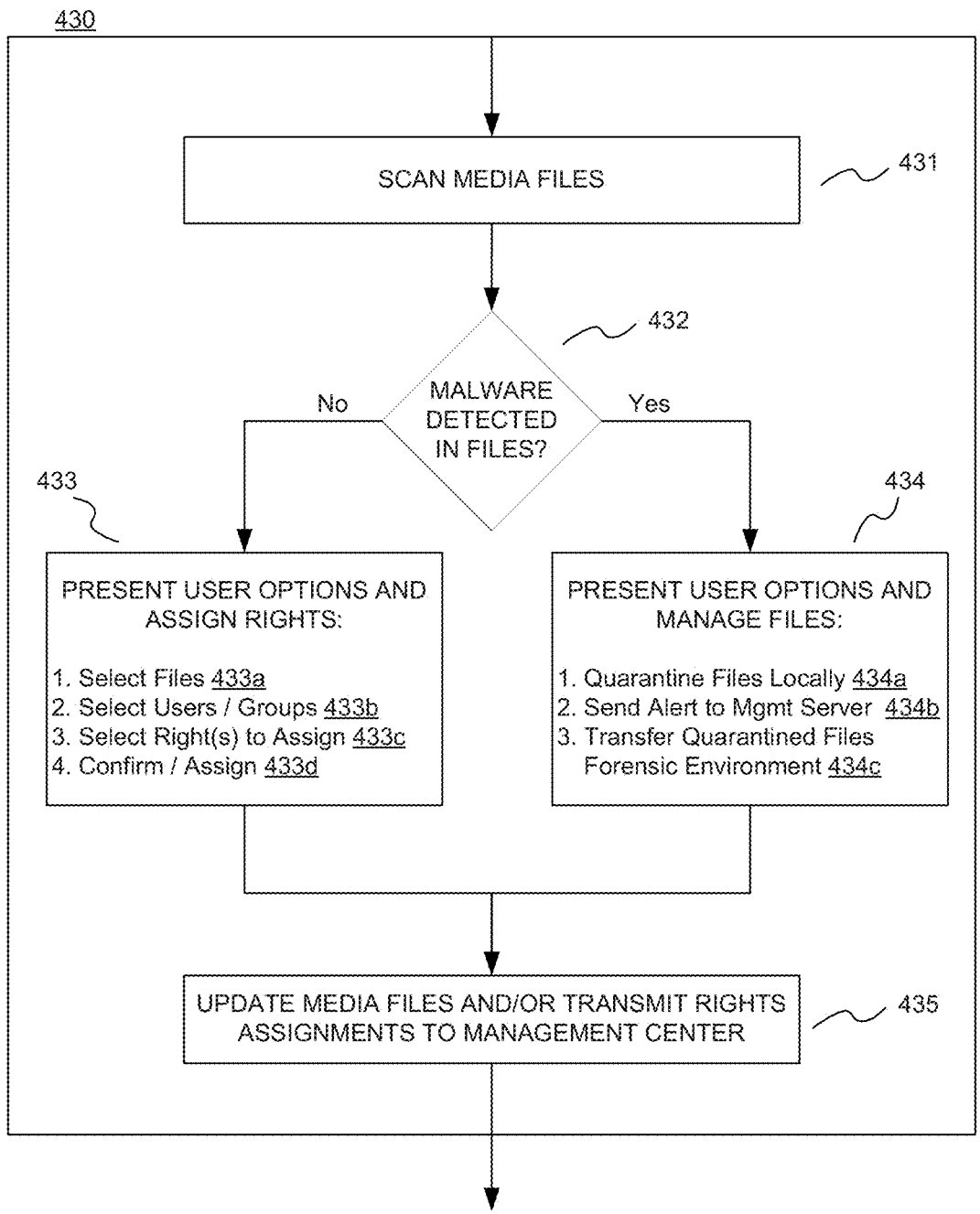
FIG. 5 is a flow diagram illustrating a method of scanning media and performing users rights assignments on scanned files in accordance with one or more embodiments.

Referring now to FIG. 5, in certain embodiments the antivirus appliance 100 may assign user rights and perform additional functions after scanning the media files in step 430. In this example, the antivirus appliance 100 user may perform various user rights management functions depending on the results of the media scan. In step 431, the antivirus appliance 100 scans the received media files as described above in reference to step 430. As discussed above, the antivirus appliance 100 may receive the media files for scanning, for example, via a portable media inserted by a user into the appliance 100, or via a direct file transfer from a secure network 210 or 220 to the appliance 100.

In step 432, after the media files are scanned, the antivirus appliance 100 determines which, if any, of the scanned media files contain malware. For any files that do not contain malware (432: No), the antivirus appliance 100 may present the user with a menu of options for reviewing the scanned files and managing rights assignments to the files in step 433. Examples of some of the possible menu options (433a-433d) are shown in FIG. 5. The antivirus appliance 100 may display the menu options on an LCD or touch screen display 120 or 125, and users may select options using the touch screen or using buttons located near the LCD screen. In this example, the first option 433a allows the user to view the list of files that have been successfully scanned, and select one or more files from the list for assigning rights to those files.

The second option 433b allows the user at the antivirus appliance 100 to select users and/or user groups that correspond to valid users on the destination network for the files selected in option 433a. For example, during the media scanning process the user of the antivirus appliance 100 may indicate that the scanned media is in the process of being transferred from one secure network 210 to another secure network 220. In this example, to support option 433b, the appliance 100 may receive a list of valid network users for the destination network 220. The antivirus appliance 100 may receive this data from a management server 205 in the management network 200, or from a source within the destination network 220. Thus, in option 433b, the user of the appliance 100 may be presented with a selectable list of valid users on the destination network for assigning rights to the selected files to certain users.

The third option 433c allows the user at the antivirus appliance 100 to select the types of rights that will be applied to the files selected in 433a for the users or groups selected in 433b. For example, if a user at the antivirus appliance 100 selects a single scanned database file ("Media.DB") using option 433a, and then selects a single user ("user1") using option 433b, then in option 433c the user may select the set of rights that will be defined for user1 on the file Media.DB. The types of rights that may be selectable during option 433c may include, for example, a right to read/view the files, a right to write in (or overwrite) the files, a right to print the files, a right to forward the files, and a right to save the files. Additionally, certain embodiments may allow the rights assignments in step 433 to include rights expiration periods. That is, when a user assigns rights in option 433c, the user may specify a length of time (e.g., 12 hours, 2 days, or 1 year, etc.) or an expiration time (e.g., 12:00.00 on Jan. 1, 2020) to define the duration of the assigned right.

After completing the menu options 433a-433c, and confirming the rights with option 433d to define a first set of user rights assignments, the user of the antivirus appliance 100 may return to any of the previous options to define additional sets of rights for different users and/or media files. For example, if the user returns to menu option 433c, the previously selected files and users/groups may still be displayed on the screen 120, and the user can define additional rights for the selected users/groups on the selected files. Similarly, if the user returns back to option 433b, the previously selected files may still be displayed, and the user may now select different users or groups to assign rights for these files. Finally, the user of the antivirus appliance 100 may return to option 433a to select a different set of files for assigning rights. Thus, by returning to options 433a-433c multiple different times, the user may define many different rights assignments, in which different users/groups have different rights defined on different files and for different lengths of times. After the user has created all of the desired rights assignments for the scanned media files, the user may indicate via a button or touch screen 120 on the antivirus appliance 100 that all the rights assignments have been defined.

If some or all of the scanned media files contain malware (432: Yes), then the antivirus appliance 100 may present the user with a different menu of options for managing and assigning rights for the corrupt files in step 434. Although the menus in steps 433 and 434 may both contain various user rights management functions and other file management functions, the menu options available to users for managing the corrupt files in step 434 may be more restrictive than the menu options available for assigning rights to clean files in step 433. In this example, users at the antivirus appliance 100 have three options relating to the corrupted files detected during the media scan 431. First, the user may select one or more of the files with malware detected and then select option 434a to quarantine the files locally. Files quarantined locally by the user may be stored on the antivirus appliance 100 and locked so that they cannot be accessed by end users on the destination network. In this example, the files designated as quarantined at the antivirus appliance 100 would not be transferred to the destination network 200 or to a management server 205, but may be stored in specifically designated quarantined location within the memory of appliance 100.

The second option 434b available for corrupt files at the antivirus appliance 100 is to send an alert to a management server 205 notifying the server of the detection of malware in the corrupt files. In this option, the user may select from the set of corrupted scanned files and the antivirus appliance 100 may display additional information on screens 120 and/or 125 describing the details of the type(s) of malware detected on the files. Based on this information about the types of malware detected and based on the properties of the files themselves, the user may determine that the management server 205 should be alerted. In other examples, the management server 205 may be automatically notified (i.e., without a user-selected option) by the antivirus appliance 100 for all malware detections in the scanned media, or for a predetermined subset of malware detections based on the types of malware detected and/or the affected files. In this example, the second option 434b may also be used in conjunction with the first option 433a. For instance, a user may first locally quarantine a set of corrupt files by identifying the files and then selecting option 434a, after which the user may alert the management server 205 of the quarantined files by selecting option 434b. This may allow an administrator at the management server 205 to deploy specially trained digital forensics personnel to retrieve and investigate the corrupt files on the antivirus appliance 100.

The third option 434c available for corrupt files at the antivirus appliance 100 is to transfer the quarantined files to a secure forensic environment for further investigation. In the example, a specifically designated forensics environment may be created at the management server 205 to store corrupt files from one or more antivirus appliances 100. Appropriate forensics personnel may be automatically notified after a new set of corrupt files are transferred into the designated forensics environment. Additionally, the antivirus appliance 100 may assign read-only rights to a specialized forensics team, using the rights management techniques described above in reference to step 433. In other examples, rather than transferring the files to a secure forensic environment at the management server 205, the corrupt files may be transferred to the destination network. By transferring the corrupt files to the destination network, either to a designated secure forensic environment or to their intended locations within the destination network, the antivirus forensic specialists may potentially perform additional investigations to determine the cause and potential effects of certain malware on the destination network, whereas quarantining the corrupted files on the antivirus appliance 100 or management server 205, or simply deleting the corrupted files, might not permit such investigations. However, in these example, the rights to the corrupted files are restricted so that end users on the destination network would not have any permissions on the corrupted files, and so that only the designated forensics user/group will have read-only access to the file.

Although steps 433 and 434 are shown as alternatives in FIG. 5, it should be understood that both may be performed in certain embodiments. For example, if a scanned media contains one or more clean files containing no malware (432: No), as well as one or more corrupt files containing malware (432: Yes), then the antivirus appliance 100 may first display the menu in step 433 for the scanned clean files, and then the menu in step 434 for the scanned corrupt files.

In step 435, after the user of the antivirus appliance 100 has selected one or more user rights assignments and other properties or options for the scanned media files, these user rights and properties may be assigned and/or implemented for the scanned media files. For example, for user rights assignments defined in steps 433 and 434 (e.g., granting various permissions to different users/groups in step 433, locking files or granting read-only permissions to a forensics alias in step 434), the antivirus appliance 100 may update the metadata properties of the media files to correspond to the rights assignments. In additional to assigning user rights, the antivirus appliance 100 may use metadata properties to create and store other options and properties defined by the user in steps 433 and 434. For example, if a user indicated that a corrupt media file should be quarantined using options 434a or 434c, the antivirus appliance 100 may create a custom quarantine property in the metadata of the corrupt file to mark that file as quarantined. After the scanned files are transferred to the destination network 220, the rights assignments and other properties defined at the antivirus appliance 100 in step 435 may be detected and enforced by the network 220. Step 435 may also comprise transmitting an alert defined by the user in step 433 or 434 to the management server 205.

In certain embodiments, in may be preferable in step 435 to implement the user rights assignments on the destination network using a rights management services (RMS) system, rather than simply updating the metadata properties of the scanned media files before they are transferred to the destination network. For example, merely updating the user permissions metadata properties of the media files might not be sufficient to enforce those user permissions after the files are transferred to their destination network. Additionally, write blocker of the antivirus appliance 100 may be engaged so that the metadata properties of the media files cannot be altered without disengaging the write blocker.

Figure 6:
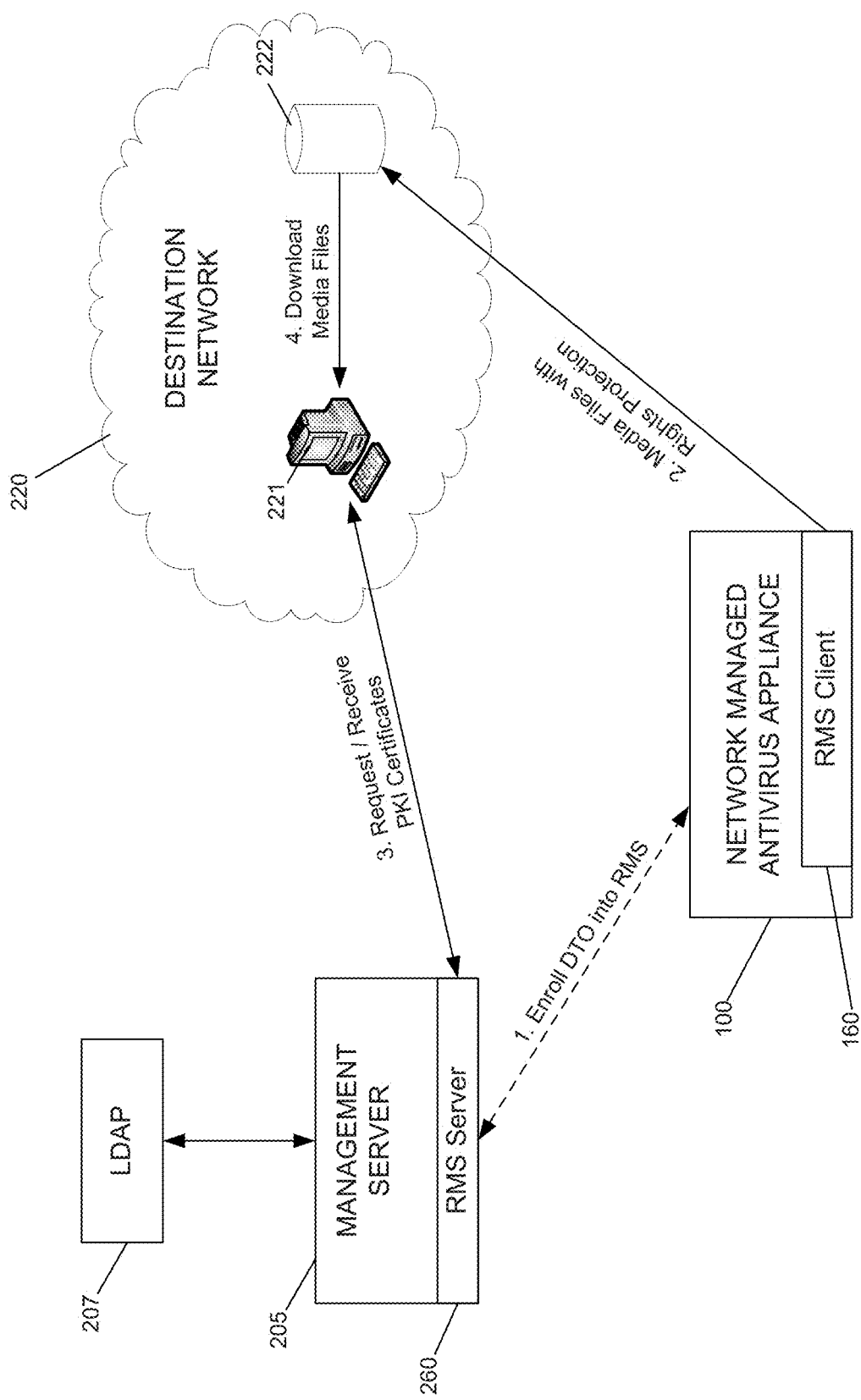
FIG. 6 is a component diagram illustrating techniques for implementing rights assignments at an antivirus appliance using a rights management services (RMS) system in accordance with one or more embodiments.

Referring now to FIG. 6, a component diagram is shown illustrating techniques for implementing user rights assignments at an antivirus appliance 100. In this example, the antivirus appliance 100 includes a rights management services (RMS) client 160, and a management server 205 includes an RMS server 260. Although the illustrative components and steps shown in FIG. 6 may be used to implement user rights assignments at the antivirus appliance 100, thus corresponding to step 435 described above, it should be understood that the steps shown in FIG. 6 need not be synchronized to coincide with step 435, but may be performed before, during, or after the steps of FIGS. 4 and 5 described above. For example, before user rights assignments can be implemented for the media files at the antivirus appliance 100, the human data transfer officer (DTO) operating the antivirus appliance 100 may be required to enroll into the RMS system of the management network 200. This step, denoted as step 1 in FIG. 6, may be performed using direct communication between the antivirus appliance 100 and the management server 205, or may be performed using other means. For example, the DTO may be enrolled into the RMS system of the management network 200 and the public and private RMS certificates (or keys) for the DTO may be created and stored before the DTO ever interacts with the antivirus appliance 100 in this example.

After the human DTO has been enrolled in the RMS system, the RMS client 160 within the antivirus appliance 100 may use a DTO's private key to implement the user rights assignments selected by the DTO in steps 433 and 434. As is well-known in RMS systems, a user's private key (e.g., an X.509 certificate) may be used as an encryption key to encrypt the files so that they are protected from access by unauthorized users. In this example, the private key of the DTO may be stored securely, for example, on a smart card or common access card issued only to the DTO. In this example, when the DTO authenticates to the smart card and logs in to the antivirus appliance 100 (e.g., applying his/her smart card to card reader 155 and entering the secure PIN), the DTO's private key may be unlocked and utilized by the RMS client 160 for the course of the DTO's session on the antivirus appliance 100. In other examples, DTO's need not provide their private key during authentication, but rather the private keys of one or more DTO's may be persistently stored in a secure memory with the RMS client 160 or antivirus appliance 100. For instance, if a DTO authenticates and/or logs in to begin a session on the antivirus appliance 100 using fingerprint scanner 150, the appliance 100 may confirm the identity of the DTO based on a fingerprint match, and may then retrieve the DTO's private key from the secure storage to use for RMS encrypting any media files for which the DTO assigns user rights.

After the antivirus appliance 100 has RMS encrypted the media files using the DTO's private key, thus implementing the user rights assignments selected by the DTO, the antivirus appliance 100 may then transfer the RMS encrypted media files to the destination network 220, denoted as step 2 in FIG. 6. One or more publishing licenses may also be transferred with the encrypted media files, the licenses defining the user rights assignments that have been implemented on the RMS encrypted media files. In this example, the antivirus appliance 100 transfers the media files to a designated content repository 222 (e.g., database, file server) within the destination network 220. However, in other examples, the RMS encrypted media files may be transferred directly to end users (e.g., desktop computer 221, or emailed to user's email addresses) according to the user rights that have been assigned to the files and/or according to other transfer options selected by the DTO at the antivirus appliance 100. In certain embodiments, when the RMS encrypted media files are transferred to the content repository 222, one or more end users on the destination network 220 may be notified that the transferred content is available. For example, the antivirus appliance 100 may create a catalog of all of the media files transferred, and what rights have been assigned for the media files, and may forward the cataloged list to the management server 205 at or near the same time that the media files are transferred to the content repository 222. The management server 205 may then notify (e.g., via email) any users on the destination network 220 that have been granted access permissions on the transferred media files, and may direct the users to the location of their available media files in the content repository 222.

The end users on the destination network 220 that have been permissioned to access the transferred media files may then retrieve the necessary RMS certificate (e.g., the RMS public key of the DTO), denoted in step 3 of FIG. 6. For example, when an end user attempts to access a media file transferred from the antivirus appliance 100, an automated process at the end user's computer may request the appropriate RMS certificates from the RMS server 260, which may then retrieve the requested public certificates from the LDAP 207 and provide them to the end user. The end users may access the media files from the content repository 222, denoted by step 4 of FIG. 6, based on the permissions accorded to the end users (e.g., view, download, print, copy, write, etc.) by the DTO and implemented at the antivirus appliance 100.

Although the above examples describe transferring files from an antivirus appliance 100 to a secure destination network 220, it should be understood that the embodiments described herein may also be used when transferring files from a secure computer network to the antivirus appliance 100. Therefore, an antivirus appliance 100 installed near a secure network may be used to scan all files received from portable media or other (secure or unsecure) networks before they are transferred onto the secure network. Similarly, an antivirus appliance 100 installed near a secure network may be used to receive media files from the secure network, and then scan those files before they are exported to a portable media or transferred to other (secure or unsecure) networks. For instance, the antivirus appliance 100 may receive files from a secure network 220, scanned the files and transmit the files scanned and scan results to the management server 205, and then export the clean files to a portable media connected the appliance 100 (e.g., a USB thumb drive, a read/writable CD or DVD, etc.). Thus, a potential advantage is that the administrator of the secure network may be able to disable some (or all) of the other export paths out of the secure network in order to ensure that all media files leaving the secure network will be scanned, cataloged, and reported to the management server 205.

Figure 7:
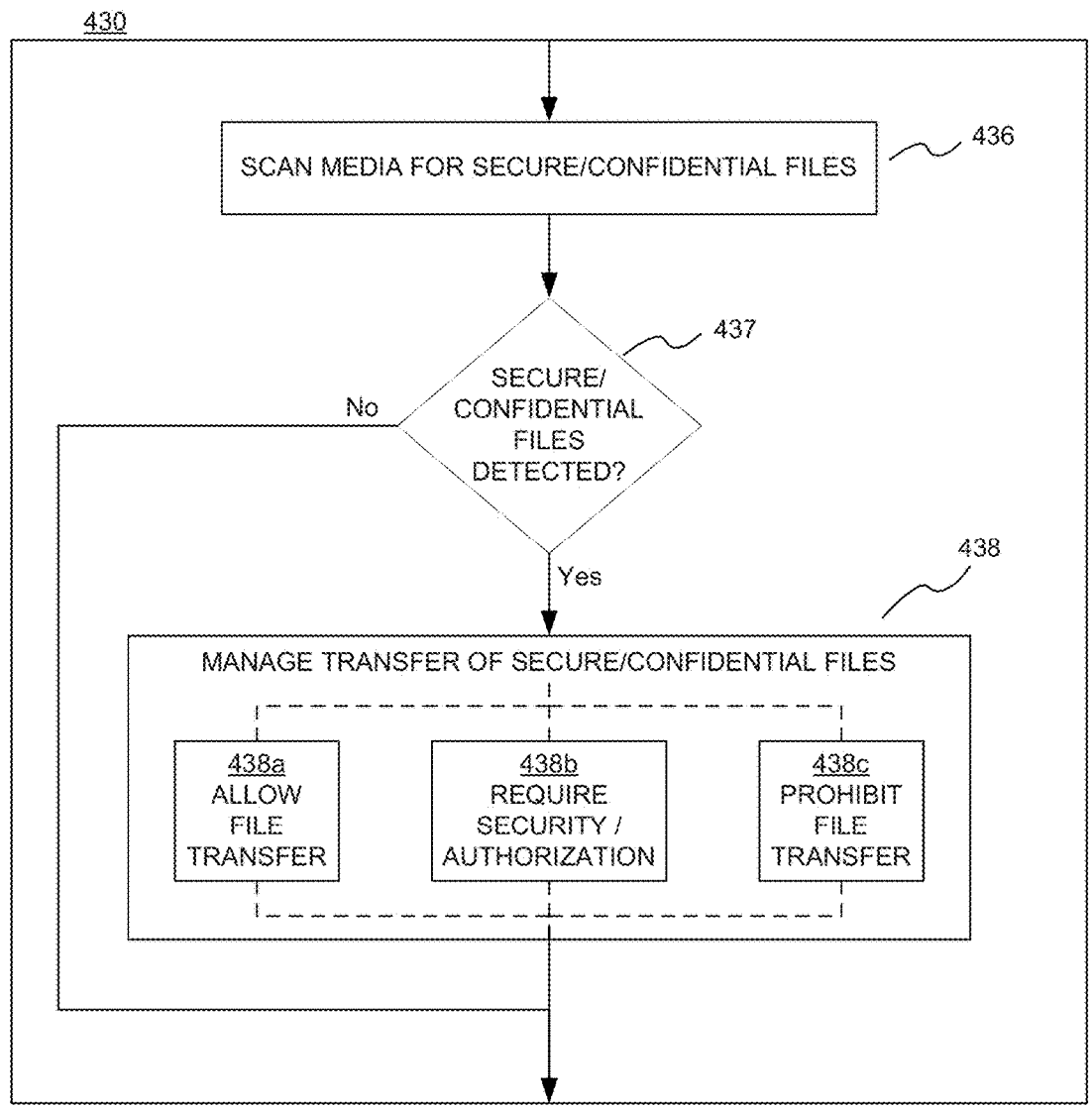
FIG. 7 is a flow diagram illustrating a method of scanning media and managing transfers of secure and/or confidential files in accordance with one or more embodiments.

Referring now to FIG. 7, in certain embodiments the appliance 100 may perform additional media scanning and document transfer functions relating to secure and/or confidential documents. For example, an appliance 100 may be configured to monitor, manage, and report the transferring of secure/confidential documents to or from secure networks 210 in addition to, or instead of, performing virus scanning functionality. In such embodiments, appliance 100 may be referred to as, for example, a document security appliance 100, or an antivirus and document security appliance 100. A document security appliance 100 may resemble the above-described embodiments of antivirus appliances 100 in some or all respects. However, a document security appliance 100 may also include additional functionality to scan media for secure files (e.g., classified, sensitive, or confidential files) and to manage the transfer of any such secure files identified during a scan. Thus, an appliance 100 configured as a document security appliance 100 may receive and install additional software (e.g., eDiscovery software and other content search tools which may be off the shelf software, customized software, or both) to scan and detect secure/confidential documents within a media, and may provide additional functionality (e.g., document encryption services, additional authorization and reporting) to manage the transferring of secure/confidential files on or off the secure network.

In step 436, the appliance 100 scans the received media files for secure and/or confidential files. The scanning process in step 436 may be similar to the process described above in reference to step 430. However, in step 436, different scanning software and scanning criteria may be used in order to identify secure and/or confidential files, rather than (or in addition to) viruses and malware. For example, eDiscovery or other content search software or document search software may be used by the appliance 100 to search for specific words within the text of the files that may indicate secure or confidential files. Besides examining the text of the media files, other file attributes such as the user permissions set on the files, metadata properties, and a level of encryption on the files, may be used to identify files that are secure and/or confidential in step 436. Additionally, as discussed above, the content scanning in step 436 may be run using virtualization software to provide an additional layer of abstraction between the scanning engine and the operating system on the appliance 100, thus providing further protection against malware that could potentially infect the operating system.

In step 437, after the media files are scanned, the appliance 100 determines which, if any, of the scanned media files contain secure and/or confidential files. For any files that do not contain secure and/or confidential files (437: No), the appliance 100 may continue with the user's requested operations (e.g., antivirus scanning, user rights management, transferring files) without performing any additional functions relating to the security or confidentiality of these files. However, if some or all of the scanned media files are determined to be secure or confidential files (437: Yes), then the appliance 100 may perform additional functions and/or may present the user a different menu of options for managing the transfer of secure and/or confidential files in step 438.

In step 438, the appliance 100 determines whether to allow the file transfer (438*a*), prohibit the file transfer (438*c*), or require additional security functions or authorization (438b) for the transferring of the secure and/or confidential files. The determination may be made based on a number of factors, which may programmed and/or configured differently for different appliances 100, different management networks 200, and different secure networks 210-220. For example, in certain embodiments, a secure network 210-220 may allow the importation of secure or confidential files onto the secure network, but may prohibit or require additional steps for the exportation of such files out of the secure network. In this example, an appliance 100 may be configured to allow the scanning and transferring of secure files from a portable media over a wired network connection onto the secure network 210-220, but might not allow any secure files received from a secure network 210-220 to be written onto a portable media connected to the appliance 100. Files may also have different levels of security/confidentiality (e.g., restricted, confidential, secret, top secret, etc.), and therefore step 438 may allow transfers of certain security levels while prohibiting or requiring additional steps for the transfer of more secure files. In embodiments in which a user has authenticated to the appliance 100, the identity and a security level of the user may also be used in step 438 to determine whether to allow, prohibit, or require additional steps for the transfer. Additional factors, such as the time and/or date of the attempted transfer, and the number of files being transferred, also may be used in the determination.

As shown in step 438, certain secure/confidential files within the requested transfer may be allowed to be transferred (option 438a), while other secure/confidential files may be prohibited from being transferred by the appliance 100 (option 438c). For still other secure/confidential files, the appliance 100 might only allow the transfer if additional security-related steps or authorization are successfully performed (option 438b). For example, step 438b may require that the secure/confidential files must be encrypted before they are transferred out of a the secure network 210-220 onto a portable media (or vice-versa). Step 438b may also require additional user confirmation and/or authorization before allowing the files to be transferred. For example, if the user of the appliance 100 does not have a sufficient authorization level, the appliance 100 may require that authorization credentials from a higher-level user are input into the appliance 100 before performing the transfer. In other examples, the appliance 100 may request permission from the management network server 205 before performing the secure and/or confidential file transfer. In any of these examples, and for any of options 438a, 438b, or 438c, the appliance 100 may provide a warning message on screens 120 or 125 and/or may require user confirmation before proceeding. The appliance 100 may also log the transfer of any secure and/or confidential files (e.g., file names, security level, user transferring, time, date, etc.) which may be stored locally and/or sent as a notification to a network management server 205.

Figure 8:
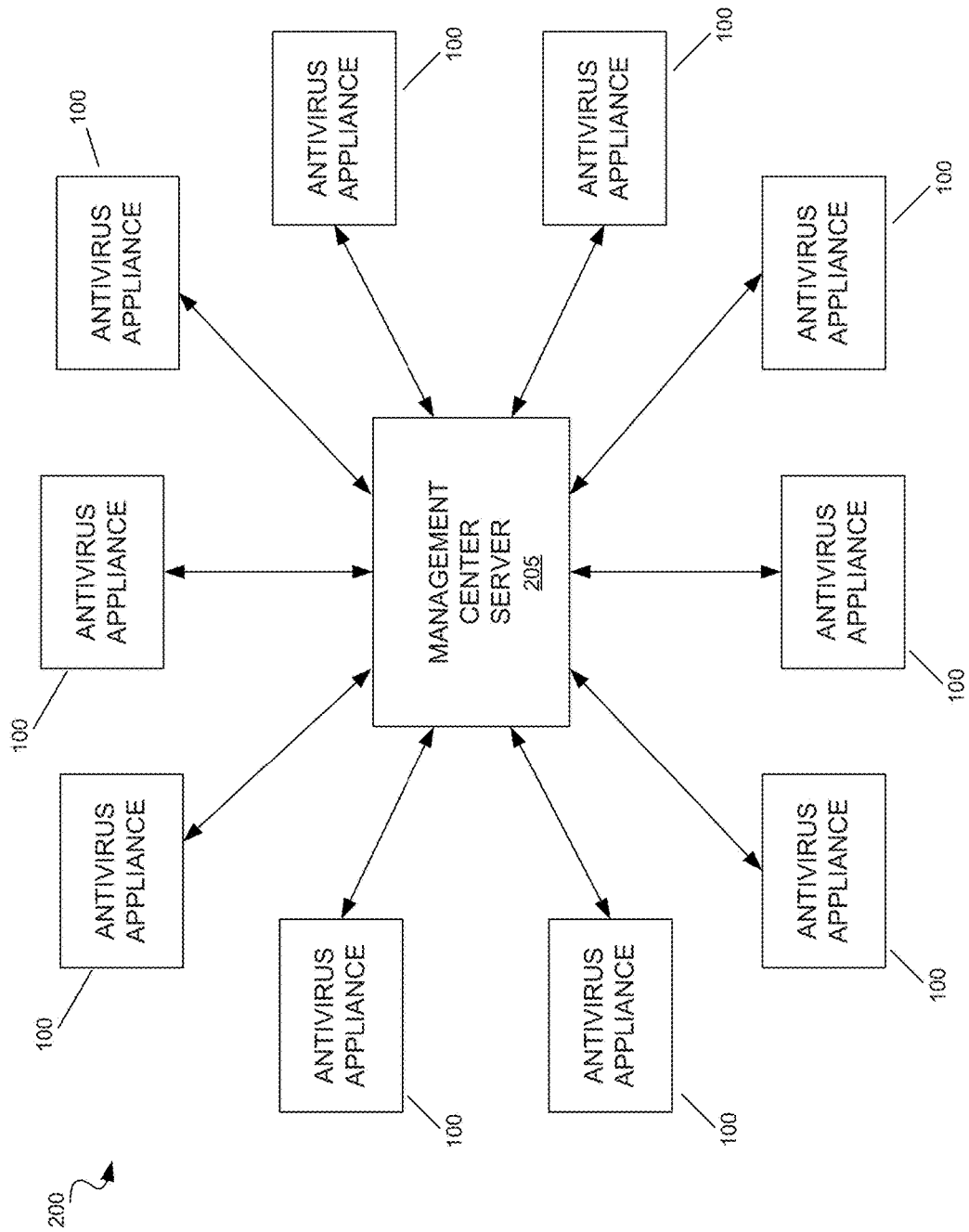
FIG. 8 is a component diagram including an antivirus appliance management network, including a management center server and a plurality of a network managed antivirus appliances in accordance with one or more embodiments.

Referring now to FIG. 8, a component diagram is shown including an antivirus appliance management network 200, including a management center server 205 and a plurality of a network managed antivirus appliances 100. As FIG. 8 conceptually illustrates, a management center server 205, which may comprise a single computer server or combination of computer servers in one or more physical locations, may be centrally located within communication network 200 and may be in communication with a plurality of independent network managed antivirus appliances 100. In this example, the antivirus appliances 100 in the communication network 200 may be spread across many remote geographic locations, and may be operated and maintained independently by the users/operators at those remote locations. However, the structure of the management network 200 may permit the management center server 205 to provide centralized management capabilities, distribute antivirus software and virus definition file updates to the appliances 100, and receive virus scanning results and alerts from the appliances 100. For example, the management center server 205 may ensure that the OS versions, antivirus scanning software version, and the definitions lists for each of the antivirus appliances 100 are current and match an enterprise-approved configuration. Additionally, the antivirus appliances 100 in the network 200 may report all virus scanning activity, and any virus or malware detection to the management center server 205.

After receiving virus scanning activity data from the antivirus appliances 100, the management center server 205 may perform a compilation and analysis of the virus scanning data and may generate reports and/or statistics to summarize the data. The management center server 205 may generate reports/statistics for an individual antivirus appliance (e.g., based on a unique identifier or IP address), for a group of antivirus appliances 100 (e.g., all antivirus appliances within a certain geographic region, or all antivirus appliances 100 within a certain organizational branch of the overall network 200), and/or for all antivirus appliances 100 within the network 200.

In certain embodiments the management center server 205 may generate reports/statistics according to a predetermined schedule. For example, virus scanning activity reports may be automatically generated by the server 205 for one or more of the antivirus appliances 100 on a fixed time interval (e.g., hourly, daily, weekly, monthly, yearly, etc.). In other embodiments, the server 205 may generate reports and/or statistics based on the triggering of an event, for example, a user command from a local user of the management center server 205 to create a network-wide virus scanning activity report over a period of time, or a user command from a local user of an antivirus appliance 100 to create a virus scanning activity report only for that antivirus appliance 100. Report/statistics generation may also be triggered automatically based on the receipt of virus detection data from one or more of the antivirus appliances 100.

Figure 9:
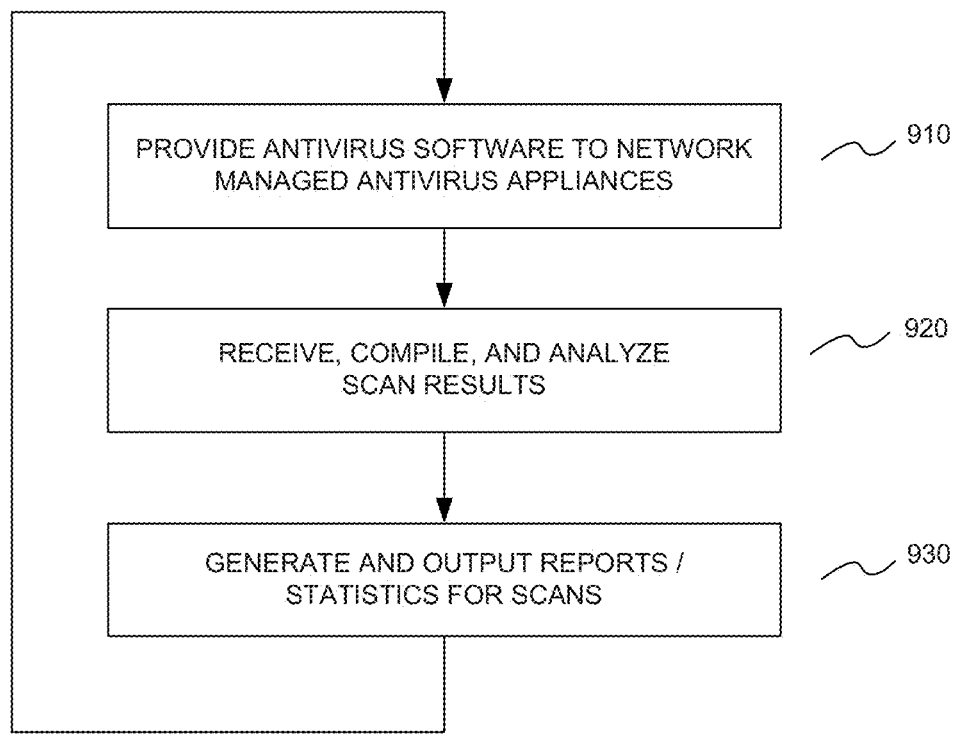
FIG. 9 is a flow diagram illustrating a method of managing network managed antivirus appliances in accordance with one or more embodiments.

Referring now to FIG. 9 a flow diagram is shown illustrating a method of managing network managed antivirus appliances 100. Referring to the illustrative architecture of the management network 200 shown in FIG. 8, the steps shown in this example may be performed by the management center server 205. In step 910, management center server 205 may provide operating system updates, antivirus software, definitions of viruses and other malware, and/or content searching software to one or more of the network managed antivirus appliances 100 within the management network 200. In certain embodiments, the initial installation of antivirus (and/or content searching) software may be performed locally at the network managed antivirus appliances 100, but subsequent software versions, upgrades, patches, and new virus definition files, etc., may be transmitted automatically from the management center server 205. Additionally, in step 910, the management center server 205 may query individual antivirus appliances 100 (e.g., periodically or in response to a triggering event) to identify the OS version, scanning software versions, and/or current definition files on the antivirus appliances. In this example the management center server 205 can determine which scanning software and/or virus definitions should be sent to each of the respective antivirus appliances 100 so that the appliances 100 are up to date for the purposes of malware scanning (and/or content searching).

In step 920, the management center server 205 receives scanning results and/or statistics from one or more of the antivirus appliances 100 in the management network 200. In certain embodiments, the antivirus appliances 100 may be configured to transmit all scanning results immediately after a scan is performed, therefore, the management center server 205 may receive results from any of its connected antivirus appliances 100 at any time. In other embodiments, the management center server 205 may coordinate a schedule for the transmission of scanning results from each of its antivirus appliances 100. Thus, a network managed antivirus appliance 100 may be configured to locally store all of its scanning results until a scheduled time to transmit the compiled results to the management center server 205, after which the results may be cleared from the local memory. As discussed above, the scan results received by the management center server 205 may include, among other information, an IP address or other identifier of the appliance 100 that performed the scan, a user identifier corresponding to the person that performed the scan on the antivirus appliance 100, the date and time of the scan, and the results of the scan, for example, a pass/fail indication, a number of files (or amount of data) scanned, the types of files or data scanned, the time taken to complete the scan, and identifiers corresponding to any viruses or malware (or secure/confidential files) identified during the scan.

In step 930, the management center server 205 analyzes the scanning data (e.g., malware and virus detections, secure file detections) received in step 920, then generates statistics and/or one or more reports to summarize the data. By compiling and analyzing data from many different antivirus appliances 100, the statistics and reports may potentially identify attacks and vulnerabilities across the management network 200 and associated computer networks (e.g., secure networks 210 and 220). After any statistics and/or reports are generated in step 930, they may be displayed/printed to a local user of the management center server 205, or communicated to remote users, for example, by emailing the reports to system administrator or threat analysis personnel, or archiving the reports in a virus scanning result database. Additionally, in certain embodiments, some reports may be transmitted back to the individual antivirus appliances 100 so that they may be displayed and viewed by users/operators of the appliances.

It should be understood that the steps 910-930 in FIG. 9 are only illustrative of the various functionality supported by certain embodiments of a management center server 205. Each step 910-930 need not be performed in all embodiments, each step 910-930 need not be performed only once, and each step 910-930 need not be performed in the order shown in FIG. 9. For example, a management center server 205 in certain embodiments may receive and process scanning results (step 920) many different times based on scans from a plurality of different antivirus appliances 100 over a period of time, before the management center server 205 performs a single analysis and report generation function (step 930). Additionally, in some embodiments, the management center server 205 may search for and provide antivirus updates (step 910) after every report generation (step 930) for a certain antivirus appliance 100.

It should be understood that any of the method steps, procedures or functions described herein may be implemented using one or more processors in combination with executable instructions that cause the processors and other components to perform the method steps, procedures or functions. As used herein, the terms "processor" and "computer" whether used alone or in combination with executable instructions stored in a memory or other computer-readable storage medium should be understood to encompass any of various types of well-known computing structures including but not limited to one or more microprocessors, special-purpose computer chips, digital signal processors (DSPs), field-programmable gate arrays (FPGAS), controllers, application-specific integrated circuits (ASICS), combinations of hardware/firmware/software, or other special or general-purpose processing circuitry.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Although specific examples of carrying out the invention have been described, those skilled in the art will appreciate that there are numerous variations and permutations of the above-described systems and methods that are contained within the spirit and scope of the invention as set forth in the appended claims. Any and all permutations of the features described herein are within the scope of the invention.

We claim:

1. An apparatus comprising:
   at least one processor;
   at least one device port or drive configured to communicatively receive connection of a portable storage medium attached to the apparatus; and
   at least one memory storing computer readable instructions that, when executed by the at least one processor, cause the apparatus to:
      generate a virtualized instance of a virus scanning application;
      scan, for viruses using the virtualized instance, a plurality of files stored on the portable storage medium;
      determine, based on an encryption level of a first file of the plurality of files, that the first file is confidential;
      determine, based on the first file being confidential, that a user of the apparatus is authorized to transfer the first file;
      receive first user input that indicates a destination network for the first file;
      send, based on the first user input, a request for users of the destination network;
      receive, based on the request, an indication of valid users of the destination network;
      cause display of information that indicates the valid users;
      receive, based on the information that indicates the valid users, second user input that indicates one or more valid users that are to receive at least one user right for the first file;
      receive third user input that indicates, for the one or more valid users, a user rights assignment for the first file;
      based on detecting a first virus in a second file of the plurality of files, determine, based on a virus type of the first virus, a quarantine option for the second file;
      send, to a server, results of the scan of the plurality of files;
      send, to the destination network, the first file; and send, to the server and to cause the one or more valid users to be notified of the first file, data that indicates the user rights assignment and that indicates the one or more valid users.

2. The apparatus of claim 1, wherein the computer readable instructions, when executed by the at least one processor, cause the apparatus to:
communicate, based on an operating system of the apparatus, with the at least one device port or drive, wherein the operating system is stored on a solid state medium that is removable from the apparatus, and wherein the virtualized instance is configured to provide a layer of abstraction between the virus scanning application and the operating system.

3. The apparatus of claim 1, wherein the apparatus is configured to not modify the portable storage medium based on the user rights assignment for the first file.

4. The apparatus of claim 1, further comprising a smart card reader, wherein the computer readable instructions, when executed by the at least one processor, cause the apparatus to:
receive, via the smart card reader, data corresponding to a private encryption key, wherein the private encryption key is associated with the user of the apparatus; and
encrypt, using the private encryption key, the first file.

5. The apparatus of claim 1, further comprising at least one of a biometric scanner or a smart card reader, wherein the at least one memory stores additional computer readable instructions that, when executed by the at least one processor, further cause the apparatus to:
authenticate, based on input received via the biometric scanner or the smart card reader, the user of the apparatus;
retrieve, from a secure memory of the apparatus, a private encryption key associated with the user of the apparatus; and
encrypt, using the private encryption key, the first file.

6. The apparatus of claim 1, wherein the computer readable instructions, when executed by the at least one processor, cause the apparatus to:
modify first metadata, of the first file, to indicate the user rights assignment; and
modify second metadata, of the second file, to indicate the quarantine option.

7. The apparatus of claim 1, wherein the computer readable instructions, when executed by the at least one processor, cause the apparatus to:
based on a determination that the apparatus has been physically compromised, send, to the server, an alert that indicates the apparatus has been physically compromised; and
based on the determination that the apparatus has been physically compromised, configure the apparatus to remove a function of the apparatus.

8. A method comprising:
generating, by a computing device, a virtualized instance of a virus scanning application;
scanning, by the computing device, for viruses using the virtualized instance, a plurality of files stored on a portable storage medium attached to the computing device via at least one device port or drive;
determining, by the computing device and based on an encryption level of a first file of the plurality of files, that the first file is confidential;
determining, based on the first file being confidential, that a user of the computing device is authorized to transfer the first file;
receiving, by the computing device, first user input that indicates a destination network for the first file;
sending, by the computing device, based on the first user input, a request for users of the destination network;
receiving, by the computing device, based on the request, an indication of valid users of the destination network;
causing, by the computing device, display of information that indicates the valid users;
receiving, by the computing device, based on the information that indicates the valid users, second user input that indicates one or more valid users that are to receive at least one user right for the first file;
receiving, by the computing device, third user input that indicates, for the one or more valid users, a user rights assignment for the first file;
based on detecting a first virus in a second file of the plurality of files, determining, based on a virus type of the first virus, a quarantine option for the second file;
sending, by the computing device to a server, results of the scan of the plurality of files;
sending, by the computing device to the destination network, the first file; and
sending, by the computing device to the server, and to cause the one or more valid users to be notified of the first file, data that indicates the user rights assignment and that indicates the one or more valid users.

9. The method of claim 8, further comprising:
communicating, based on an operating system of the computing device, with the portable storage medium, wherein the operating system is stored on a solid state medium that is removable from the computing device, and wherein the virtualized instance is configured to provide a layer of abstraction between the virus scanning application and the operating system.

10. The method of claim 8, wherein the portable storage medium is not modified based on the user rights assignment for the first file.

11. The method of claim 8, further comprising:
receiving, via a smart card reader of the computing device, data corresponding to a private encryption key, wherein the private encryption key is associated with the user of the computing device; and
encrypting, using the private encryption key, the first file.

12. The method of claim 8, further comprising:
authenticating, based on input received via a biometric scanner or a smart card reader of the computing device, the user of the computing device;
retrieving, from a secure memory of the computing device, a private encryption key associated with the user of the computing device; and
encrypting, using the private encryption key, the first file.

13. The method of claim 8, further comprising:
modifying first metadata, of the first file, to indicate the user rights assignment; and
modifying second metadata, of the second file, to indicate the quarantine option.

14. The method of claim 8, further comprising:
based on a determination that the computing device has been physically compromised, sending, by the computing device to the server, an alert that indicates the computing device has been physically compromised; and based on the determination that the apparatus has been physically compromised, configuring the computing device to remove a function of the computing device.

15. A method comprising:
generating, by a computing device, a virtualized instance of a virus scanning application;
receiving, by a computing device as part of a transfer of files between a first network and a second network, a plurality of files, wherein the computing device, during the transfer of files, is connected to both the second network and the first network;
scanning, by the computing device, for viruses using the virtualized instance of the virus scanning application, the plurality of files;
determining, by the computing device and based on an encryption level of a first file of the plurality of files, that the first file is confidential;
determining, based on the first file being confidential, that a user of the computing device is authorized to transfer the first file;
receiving, by the computing device, first user input that indicates a destination network for the first file, wherein the destination network is the first network or the second network;
sending, by the computing device, based on the first user input, a request for users of the destination network;
receiving, by the computing device, based on the request, an indication of valid users of the destination network;
causing, by the computing device, display of information that indicates the valid users;
receiving, by the computing device, based on the information that indicates the valid users, second user input that indicates one or more valid users that are to receive at least one user right for the first file;
receiving, by the computing device, third user input that indicates, for the one or more valid users, a user rights assignment for the first file;
based on detecting a first virus in a second file of the plurality of files, determining, based on a virus type of the first virus, a quarantine option for the second file;
sending, by the computing device to a server, results of the scan of the plurality of files;
sending, by the computing device to the destination network, the first file; and
sending, by the computing device to the server, and to cause the one or more valid users to be notified of the first file, data that indicates the user rights assignment and that indicates the one or more valid users.

16. The method of claim 15, further comprising:
configuring, based on an operating system of the computing device, one or more network interfaces to communicate with the first network and the second network, wherein the operating system is stored on a solid state medium that is removable from the computing device, and wherein the virtualized instance is configured to provide a layer of abstraction between the virus scanning application and the operating system.

17. The method of claim 15, further comprising:
authenticating, based on input received via a biometric scanner or a smart card reader of the computing device, the user of the computing device;
retrieving, from a secure memory of the computing device, a private encryption key associated with the user of the computing device; and
encrypting, using the private encryption key, the first file.

18. The method of claim 15, further comprising:
modifying first metadata, of the first file, to indicate the user rights assignment; and
modifying second metadata, of the second file, to indicate the quarantine option.

19. An apparatus comprising:
at least one processor;
at least one device port or drive configured to communicatively receive connection of a portable storage medium attached to the apparatus; and
at least one memory storing computer readable instructions that, when executed by the at least one processor, cause the apparatus to:
generate a virtualized instance of a virus scanning application;
receive, as part of a transfer of files between a first network and a second network, a plurality of files, wherein the apparatus, during the transfer of files, is connected to both the second network and the first network;
scan, for viruses using the virtualized instance of the virus scanning application, the plurality of files;
determine, based on an encryption level of a first file of the plurality of files, that the first file is confidential;
determine, based on the first file being confidential, that a user of the apparatus is authorized to transfer the first file;
receive, first user input that indicates a destination network for the first file, wherein the destination network is the first network or the second network;
send, based on the first user input, a request for users of the destination network;
receive, based on the request, an indication of valid users of the destination network;
cause display of information that indicates the valid users;
receive, based on the information that indicates the valid users, second user input that indicates one or more valid users that are to receive at least one user right for the first file;
receive third user input that indicates, for the one or more valid users, a user rights assignment for the first file;
based on detecting a first virus in a second file of the plurality of files, determine, based on a virus type of the first virus, a quarantine option for the second file;
send, to a server, results of the scan of the plurality of files;
send, to the destination network, the first file; and
send, to the server, and to cause the one or more valid users to be notified of the first file, data that indicates the user rights assignment and that indicates the one or more valid users.

20. The apparatus of claim 19, wherein the computer readable instructions, when executed by the at least one processor, cause the apparatus to:
configure, based on an operating system of the apparatus, one or more network interfaces to communicate with the first network and the second network, wherein the operating system is stored on a solid state medium that is removable from the apparatus, and wherein the virtualized instance is configured to provide a layer of abstraction between the virus scanning application and the operating system.

21. The apparatus of claim 19, wherein the computer readable instructions, when executed by the at least one processor, cause the apparatus to:

modifying first metadata, of the first file, to indicate the user rights assignment; and modifying second metadata, of the second file, to indicate the quarantine option.

* * * * *